Nov. 22, 1938.  J. W. WHITE  2,137,554
MASTER CYLINDER FOR HYDRAULIC BRAKE SYSTEMS
Original Filed Nov. 8, 1928
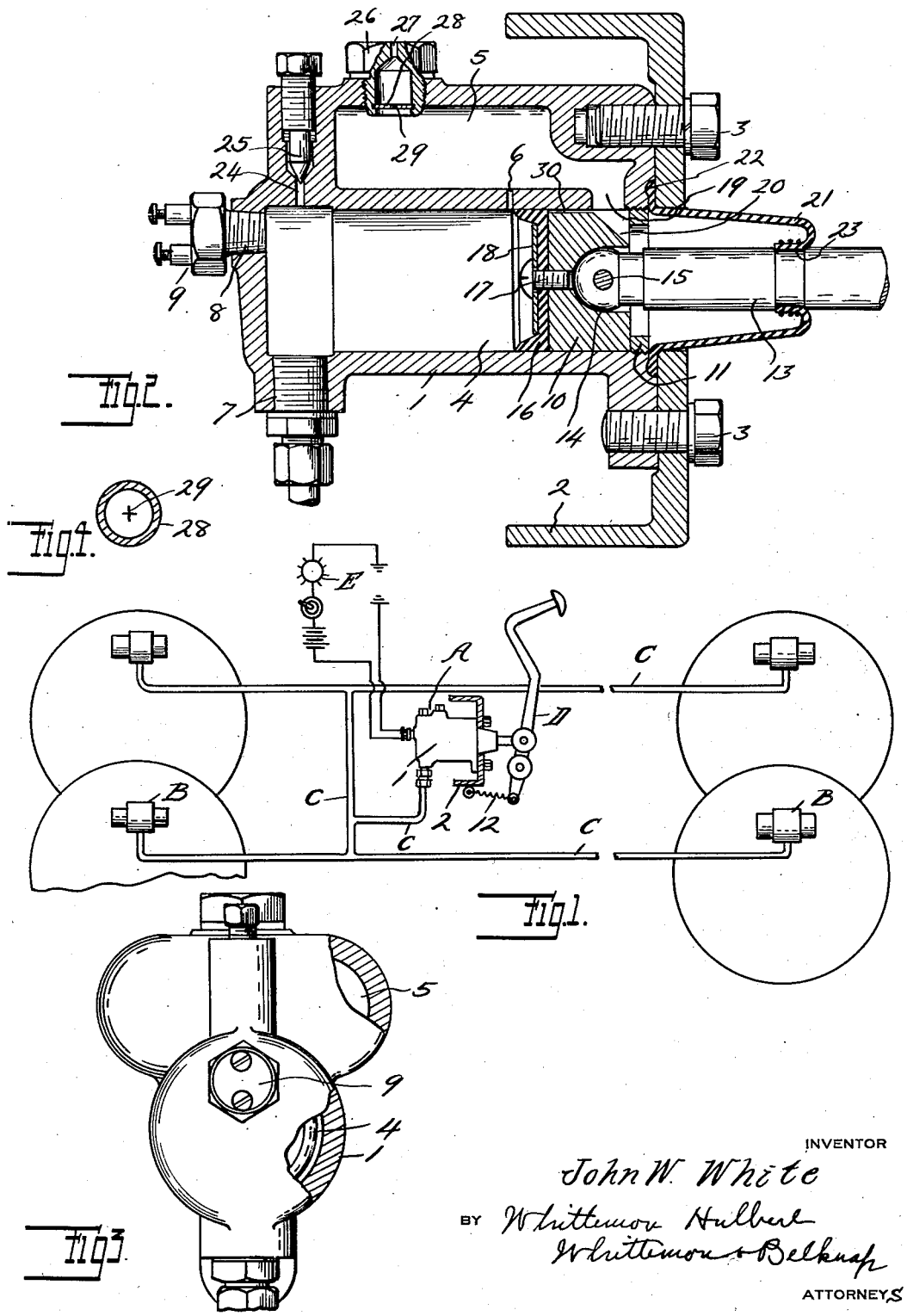
INVENTOR
John W. White
BY Whittemore Hulbert
Whittemore & Belknap
ATTORNEYS Patented Nov. 22, 1938

2,137,554

UNITED STATES PATENT OFFICE 2,137,554

MASTER CYLINDER FOR HYDRAULIC BRAKE SYSTEMS

John W. White, Detroit, Mich., assignor, by mesne assignments, to Bendix Products Corporation, a corporation of Indiana Original application November 8, 1928, Serial No. 317,933, now Patent No. 2,030,340, dated February 11, 1936. Divided and this application August 24, 1931, Serial No. 559,109

9 Claims. (Cl. 60—54.6)

The invention relates to hydraulic vehicle brake systems and forms a division of my co-pending application for patent Serial No. 317,933, filed November 8, 1928 which has now issued as Patent No. 2,030,340. The subject matter of the present application is the master cylinder through which fluid pressure is supplied to the brake cylinder and the invention consists in the construction as hereinafter set forth.

In the drawing:

Figure 1 is a diagrammatic view illustrating a system embodying this invention;

Figure 2 is a sectional view on a large scale of the master cylinder by which pressure is applied upon the fluid in the system;

Figure 3 is an end elevation of such cylinder, certain parts being broken away.

Figure 4 is a detail of the breather valve.

The braking system which embodies one application of this invention is illustrated in Figure 1 as comprising a master cylinder A by which pressure is applied to the fluid, a plurality of brake cylinders B by which the pressure on the fluid is transmitted to the wheels, and conduits C connecting the master cylinder with the brake cylinders. Pressure is created in the master cylinder A by any suitable means as by a brake pedal D and the operation of the master cylinder actuates a stop light E.

The master cylinder A is separately illustrated in Figs. 2 and 3 and as there shown comprises a casing 1 suitably mounted upon a cross channel member 2 of a motor vehicle, being secured thereto by bolts 3. Within the casing 1 is a pumping chamber 4 and a reserve or supply chamber 5 which chambers are connected by a port 6. At the forward or inner end of the chamber 4 are outlets 7, 8, the outlet 7 leading to the conduit C and thence to the brake cylinders B and the outlet 8 receiving a stop light switch 9 by which the stop light E is controlled. The switch 9 is substantially that set forth in my copending application Serial No. 241,805, filed December 22, 1927 which has now issued as Patent No. 1,840,340, and hence need not here be described in detail.

Within the chamber 4 is mounted a piston 10 actuated by the brake lever D, which piston normally rests against a ring 11 at the mouth of the chamber, being held in such normal position by a spring 12 attached to the tip of the lever D and to the channel member. The piston 10 is carried by a rod 13 which passes through an opening in the cross channel member 2. The rod 13 may be actuated in any suitable manner to advance the piston into the chamber 4 and is here shown pivotally secured at its outer end to the brake lever D. The inner end of the rod 13 is preferably ball shaped and enters a semi-spherical depression 14 in the outer end of the piston 10, being held therein by a pin 15 which locks the rod to the piston while permitting pivotal movement in the depression around the pin as the rod 13 is actuated by the lever D. Mounted on the inner end of the piston 10 is a flexible cup 16 (preferably of rubber) secured in place by a screw 17 and washer 18.

The chambers 4 and 5 are connected not only by the port 6 but also by a passage 19, the outer end of the piston 10 being cut away at 20 so that the passage 19 is open regardless of the position of the piston 10. Surrounding the inner end of the rod 13 is a boot 21 preferably conical and of flexible material. The inner and larger end of the boot 21 is clamped between the casing 1 and the cross member 2 by the bolts 3, an annular recess 22 being formed in the outer wall of the casing to receive the edge of the boot. The outer and small end of the boot is inverted as shown in Fig. 2 and wired or otherwise rigidly secured in a recess 23 on the rod 13. The ends of the boot are thus sealed and the interior of the boot is in direct communication not only with the chamber 4 but also with the chamber 5 through the passage 19.

A filling orifice 24 entering the chamber 4 is provided in the casing 1 and is sealed by a needle valve 25. Threaded into the storage chamber 5 is a breather cap 26 having a passage 27 therethrough. The upper end of the passage 27 is open at all times to the atmosphere but across the lower end of the passage 27 is a disk 28 of rubber or other flexible material, secured at its periphery to the cap 26 and provided with intersecting slots 29 (Fig. 4). The disk 28 normally closes the passage 27 but any vacuum in the chamber 5 will be broken or any excess in air pressure therein will be relieved by a flexing of the disk and a consequent opening of the slots. One or more longitudinally extending grooves or passageways 30 in the piston 10 allow liquid to enter the cylinder chamber 4 past the cup 16 when a vacuum is set up in the chamber. This is one of the important features of the invention, as will be explained later.

As the present invention relates solely to the master cylinder it will not be necessary to describe the hydraulic brake system in further detail. In general, however, the system may be filled through the orifice 24 leading into the chamber 4 and through the port 6 into the chamber 5, through the passage 19 into the boot 21 and through the conduit C into the brake cylinders B which are provided with suitable venting means (not shown) for permitting the escape of air. The air trapped in the chambers 4 and 5 is permitted to escape through the breather cap 26 previously described. However, the port 6 between the chambers 4 and 5 is so constricted that the chamber 5 will not be filled completely until after the conduit C and brake cylinders B are filled. When the system is filled the orifice 24 is closed by the valve and upon each forward stroke of the piston 10 past the port 6 fluid is forced from the chamber 4 of the master cylinder through the conduit C into the brake cylinders B which are actuated to apply the brakes. Upon the release of the brake lever D the spring 12 draws the piston 10 back, moving it faster than the fluid is returned from the conduit C into the chamber 4, thus creating a vacuum which is filled from the storage chamber 5 by the flow of fluid through the grooves 30 and past the cup 16. This over-fills the system and when the fluid is forced into the chamber 4 by the return of the brake cylinders to normal position, the excess fluid will pass through the port 6 into the storage chamber 5.

While the breather cap 26 is provided, there will be practically no breathing action in the storage chamber because the boot 21 telescopes on itself and the fluid therein will pass forward with the piston and is of the same displacement. The boot 21 thus functions not only to seal the system and permit the operation of the piston 10, but also as a container for fluid supplementing the function of the storage chamber 5.

The system is thus kept at all times completely filled with fluid and the brake cylinders are hermetically sealed. Any variance in the volume of the fluid due to expansion or contraction under weather conditions will be compensated for by the master cylinder without any attention on the part of the operator. Furthermore, any vacuum formed due to the retraction of the piston 10 will cause no disturbance in the operation of the device because the wheel cylinders B are hermetically sealed, but will draw additional fluid temporarily into the system. No air can enter the system so long as there is any fluid in the storage chamber 5 and thus the operation of the brake will remain uniform.

What I claim as my invention is:

1. In a fluid braking system, a master cylinder including a pumping chamber, a piston in said chamber, a supply chamber formed with a wall, means actuating said piston and extending from one end of said pumping chamber, and a hood attached to said actuating means and to said wall, said supply chamber communicating with said hood and sealing said piston at the outer end of said pumping chamber.

2. In a fluid braking system, a master cylinder including a pumping chamber and a supply chamber in communication with one end of said pumping chamber, a piston in said pumping chamber, actuating means for said piston extending out through the end of said pumping chamber communicating with said supply chamber and a hood connected with said actuating means and said supply chamber movable with said actuating means to maintain a substantially constant volume in said supply chamber during displacement of said piston.

3. In a fluid braking system, a master cylinder including a cylindrical pumping chamber and a supply chamber communicating with one end of said pumping chamber, a piston in said pumping chamber, a piston rod for actuating said piston, a flexible hood surrounding said piston rod and connected thereto at one end, the opposite end being connected to said master cylinder to place the space within said hood in communication with said supply chamber, said hood being fashioned to telescope with itself during inward movement of said piston rod and to maintain substantially constant volume in said supply chamber during displacement of the piston.

4. In a fluid braking system, a master cylinder, a piston in said cylinder, a piston rod for actuating said piston, a hood surrounding said rod connected thereto at one end and at its opposite end connected to said cylinder, said hood being filled with fluid and being adapted to telescope on the movement of said rod to maintain substantially constant volume between the same and the piston.

5. In a fluid braking system, a master cylinder, a piston in said cylinder, a supply chamber having a wall and communicating with said cylinder at one end and sealing said piston, a rod for actuating said piston, a hood surrounding and connected to said rod and to said wall adapted to maintain a substantially constant volume in said supply chamber during displacement of said piston and a breather for said supply chamber normally sealing the same from the external atmosphere but permitting slight ingress or egress of air to compensate for any change in fluid volume in the said chamber.

6. In a hydraulic brake system, a master cylinder, a piston movable therein, a flexible boot enclosing the rear side of the piston forming a fluid chamber, a fluid reservoir, means for providing communication between said chamber and the reservoir, means for providing communication between said chamber and the cylinder during retractile movement of the piston allowing fluid from the chamber to enter the cylinder, said cylinder having an aperture immediately in front of the retracted position of the piston whereby excess fluid in the cylinder may be returned to the reservoir.

7. In apparatus of the class described, a liquid pressure cylinder and piston therein, a piston actuating element, means forming a liquid chamber at the rear of the piston, said means comprising extensible liquid retaining means surrounding the actuating element, a reservoir for the operating liquid communicating with said chamber, and means including an aperture in the wall of the cylinder to provide fluid communication between the reservoir and the pressure developing end of the cylinder when the piston is in retracted position.

8. In a hydraulic brake system, a master cylinder, a piston movable therein, a fluid reservoir communicating with the pressure developing end of the cylinder when the piston is in retracted position, a flexible boot enclosing the end of the cylinder rearwardly of the piston, and means for providing fluid communication between the reservoir and the boot.

9. In a hydraulic brake system, a master cylinder, a piston movable therein, a fluid reservoir, said cylinder having a plurality of apertures communicating with the reservoir, one of said apertures being located immediately in front of the retracted position of the piston, and the other aperture leading to the rearward side of the piston, and a flexible boot forming a variable volume means enclosing the rearward side of the piston and adapted to receive fluid from said reservoir through the aperture at the rearward side of the piston to seal the piston against the atmosphere.

JOHN W. WHITE.